United States Patent
Kumar

(10) Patent No.: US 8,373,903 B2
(45) Date of Patent: Feb. 12, 2013

(54) EFFICIENT IMPLEMENTATION OF RASTER OPERATIONS FLOW

(75) Inventor: Santhosh Trichur Natarajan Kumar, Trichur (IN)

(73) Assignee: Texas Instruments Incorporated, Dallas, TX (US)

( * ) Notice: Subject to any disclaimer, the term of this patent is extended or adjusted under 35 U.S.C. 154(b) by 1124 days.

(21) Appl. No.: 11/467,709

(22) Filed: Aug. 28, 2006

(65) Prior Publication Data
US 2006/0285144 A1 Dec. 21, 2006

Related U.S. Application Data

(62) Division of application No. 10/142,868, filed on May 13, 2002.

(51) Int. Cl.
*H04N 1/40* (2006.01)

(52) U.S. Cl. ........ 358/3.24; 358/1.1; 358/1.9; 358/1.13; 358/1.16

(58) Field of Classification Search .................... 358/1.9, 358/1.13, 2.1; 715/527
See application file for complete search history.

(56) References Cited

U.S. PATENT DOCUMENTS

| | | | |
|---|---|---|---|
| 4,307,415 A * | 12/1981 | Sundermeyer et al. | 358/515 |
| 4,342,047 A * | 7/1982 | Niemczyk et al. | 358/504 |
| 4,924,301 A * | 5/1990 | Surbrook | 358/534 |
| 5,283,560 A | 2/1994 | Bartlett | |
| 5,303,334 A * | 4/1994 | Snyder et al. | 358/1.9 |
| 5,315,691 A * | 5/1994 | Sumiya et al. | 358/1.9 |
| 5,511,156 A * | 4/1996 | Nagasaka | 358/1.1 |
| 5,533,170 A * | 7/1996 | Teitzel et al. | 358/1.8 |
| 5,894,338 A | 4/1999 | Miehle et al. | |
| 5,907,640 A | 5/1999 | Delean | |
| 5,999,191 A | 12/1999 | Frank et al. | |
| 6,067,097 A * | 5/2000 | Morita et al. | 345/505 |
| 6,334,001 B2 * | 12/2001 | de Queiroz et al. | 382/233 |
| 7,161,711 B2 * | 1/2007 | Mori et al. | 358/1.9 |
| 2002/0026453 A1 * | 2/2002 | Mori et al. | 707/104.1 |

* cited by examiner

*Primary Examiner* — Richard Zhu
(74) *Attorney, Agent, or Firm* — Robert D. Marshall, Jr.; Wade James Brady, III; Frederick J. Telecky, Jr.

(57) ABSTRACT

According to one aspect, a printer supports transparency operations by generating mask data at interpretation stage which indicates whether each bit of a page content would be determined by the result of a raster operation or a prior destination value. The mask data can be used to complete quickly rendering of a page image once the rendering starts. Another aspect enables color fills of objects to be performed efficiently. A raster operations engine may determine whether all the points (pixels) of the object would have the same value if the raster operation is performed. If all pixels would have the same value, the value for only one pixel is computed and used for multiple pixels of the object. According to another aspect, when a pattern is to be tiled on an entire image portion, the pattern data is stored in a memory and provided as an input to rendering operation multiple times.

12 Claims, 2 Drawing Sheets

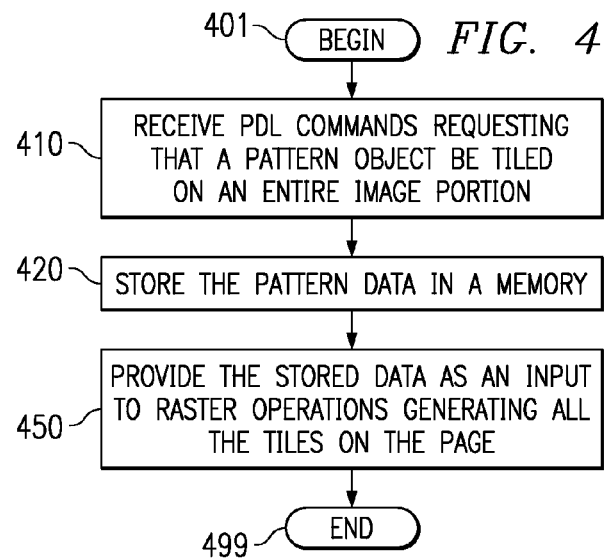
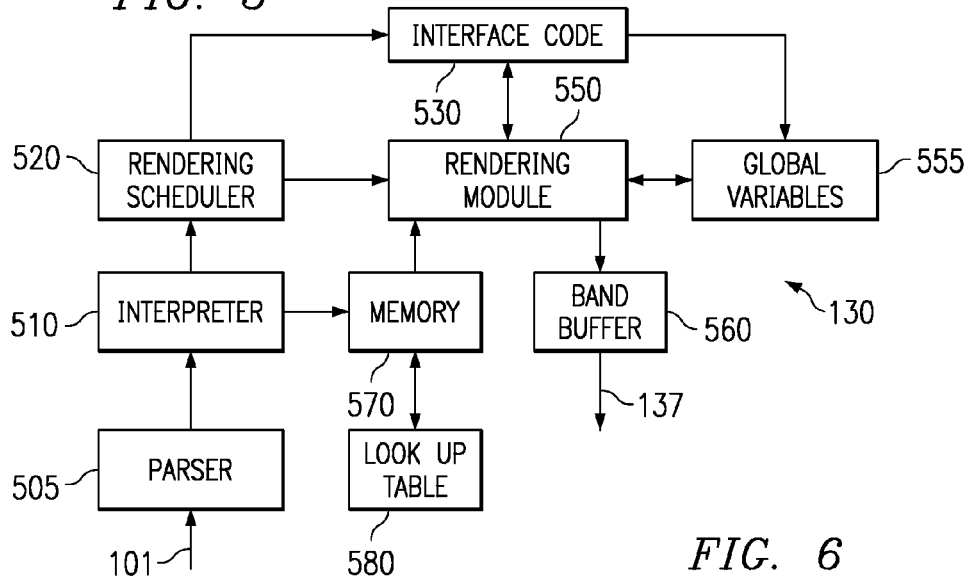
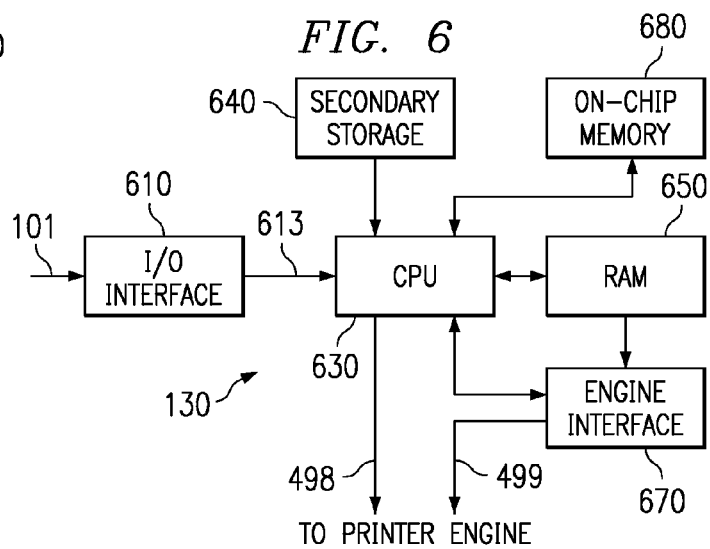

EFFICIENT IMPLEMENTATION OF RASTER OPERATIONS FLOW

This application is a divisional application of U.S. patent application Ser. No. 10/142,868 filed May 13, 2002.

BACKGROUND OF THE INVENTION

1. Field of the Invention

The present invention relates to printers, and more specifically to a method and apparatus for efficient implementation of raster operations specified by a page description language (PDL

2. Related Art

Printers are often used to print a specified content (received from an external system such as personal computers) on medium such as paper. The content to be printed ("page content") is typically specified by page description languages (PDL) such as Postscript (PS) and Printer Control Language (PCL), as is well known in the relevant arts. Printing generally entails converting page content specified by a PDL to a corresponding bit map. The bit map may then be used to print the content on a desired medium (e.g., paper).

Bit maps are often generated by performing raster operations on data representing source, destination and paint. As is well known, a destination generally refers to a bit-map formed by rendering the display-list elements up to that point of time. A source refers to a current display list element being rendered, and paint refers to the shade of color or a pattern that the source may be filled with in the destination. Destination is generally generated based on the source and paint.

The destination resulting from the performance of the raster operations generally represents the page content to be printed on a page. As the page content is generated by performing raster operations, it is generally required to implement the raster operations while meeting/balancing various requirements such as throughput performance and memory requirements.

One situation in which such a requirement may be present is in supporting transparencies. Transparency generally refers to a feature in which an image portion represented by an operand to be "transparent" such that another image portion represented by another operand can appear in the page content. The raster operation flow may need to be implemented while meeting/balancing various requirements while supporting transparency.

Another situation in which such a requirement (to meet/balance as noted above) may be present is when a color value is to be used to be fill objects while performing the raster operations. A color value refers to a constant value which could be used to fill an object subject to the performance of a raster operation. All points of a paint operand are some times present as a color value as is well known in the relevant arts. The paint operand can other times be a pattern. Raster operations using the patterns may also need to be implemented efficiently.

SUMMARY OF THE INVENTION

A printer in accordance with an aspect of the present invention supports efficient support for transparency operations. In an embodiment, a printer controller receives commands containing raster operations. The raster operations are designed to use one or more of a source, a paint and a destination as operands (to logical operations) to generate a bit map representing an image portion. The commands further specify whether transparency is effective for the source object and the paint.

The printer controller may generate mask data representing whether each point of the image portion should equal the destination or a result of a corresponding raster operation. The bit map is then generated based on a result of the multiple raster operations or the destination according to the mask data. In an embodiment, the mask data is generated at an interpretation stage so that the page content can be rendered quickly once started. In addition, the mask data can be generated conveniently at an interpretation stage as the data corresponding to all the color planes may need to be available to the interpreter for other purposes.

In one implementation, a raster operation is not performed if a corresponding one of the multiple bits in the mask data indicates that the corresponding point in the image portion should equal the destination. In another implementation, the raster operations are performed for all the bits of the image, and either a prior destination value or a result of the raster operation is selected according to the mask data.

Another aspect of the present invention enables images to be rendered with minimal processing requirements when filling color in an image portion of a page to be printed. A printer may receive commands specifying content for a portion of the page, with the commands specifying a raster operation to be performed to generate a bit map representing the portion. The raster operation may be performed using at least one operand, with the commands indicating that the one operand is to be filled with a color.

The printer may determine whether performing the raster operation would result in a same value being generated for all of the points of the image portion (object). If the same value would be generated, the printer may perform the raster operation for one point of the image portion to determine the value, and use the same value for all of the points. An example raster operation where the same value would result is when an inversion of the source or paint operand is specified.

According to one more aspect of the present invention, a pattern may be tiled on an entire image portion while minimizing the processing and storage requirements. The pattern data of the pattern may be stored in a memory and the stored data is provided multiple times to enable tiling of the pattern on the entire image portion.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein:

FIG. 4 is a flow chart illustrating the manner in which a printer may efficiently support tiling of a pattern according to an aspect of the present invention;

FIG. 5 is a block diagram illustrating the details of an embodiment of a printer controller; and FIG. 6 is a block diagram illustrating the details of an embodiment of a printer controller implemented substantially in hardware.

DETAILED DESCRIPTION OF THE PREFERRED EMBODIMENTS

1. Overview and Discussion of the Invention

According to an aspect of the present invention, mask data representing whether the destination (for each point) should equal a prior destination (of the same point) or the result of a raster operation, may be generated. The data may be generated potentially ahead of the beginning of rendering operations. The bit map data is generated based on either a destination value or a result of the raster operation according to the mask data.

As the mask data is generated ahead, the page content can be generated quickly once the rendering operations start. In addition, the mask data can be generated conveniently at an interpretation stage (as opposed to later stages) as the data corresponding to all the color planes is available to the interpreter.

According to another aspect of the present invention, when using a color value to fill an object/region, the raster operation is examined to determine whether the same value can be used to fill the entire object/region. If it can be so filled, the raster operation may be performed only for one point of the object and the result may be used for all the points of the objects. The processing requirements may be minimized as a result.

According to one more aspect of the present invention, when a pattern is to be tiled on an entire image portion, the same data representing the pattern is used to fill the image portion. A prior system may generate a bit map representing a new image (having the same shape and dimensions as the entire image portion) with the pattern tiled on the entire new image, and then perform raster operations of the entire image portion and the new image on a bit by bit basis. At least in comparison with such a prior system, the processing and memory requirements may be minimized in embodiments according to an aspect of the present invention.

Several aspects of the invention are described below with reference to example environments for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Printer

Figure 1:
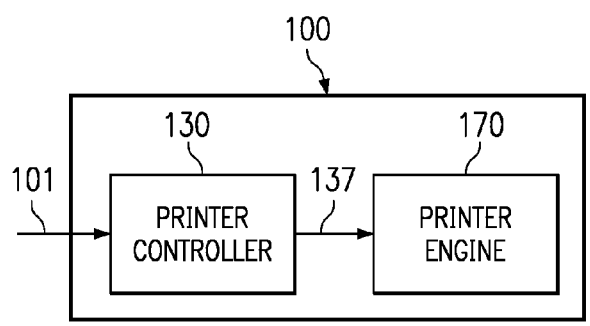
FIG. 1 is a block diagram illustrating the details of an example printer.

FIG. 1 is a block diagram illustrating the details of an embodiment of printer 100 in accordance with the present invention. Printer 100 is shown containing printer controller 130 and printer engine 170. Each component is described in further detail below.

Printer engine 170 receives on path 137 a bitmap (representing the page content to be printed) suitable in format for printing, and prints the bit map on medium such as paper. Printer engine 170 can be implemented in a known way. In an embodiment, printer engine 170 is implemented using laser technology.

Printer controller 130 may receive statements (defining a page content to be printed) on path 101, and generates a bitmap representing the page content. The statements may be received from an external computer system (not shown), and be specified in a page description language (PDL) such as Printer Control Language (PCL) or PostScript, well known in the relevant arts.

Bit maps are often generated by performing raster operations on data representing source, destination and paint as described in the above sections. The manner in which various requirements may be met/balanced is described in further detail below.

3. ROPs in the Context of Transparencies

Figure 2:
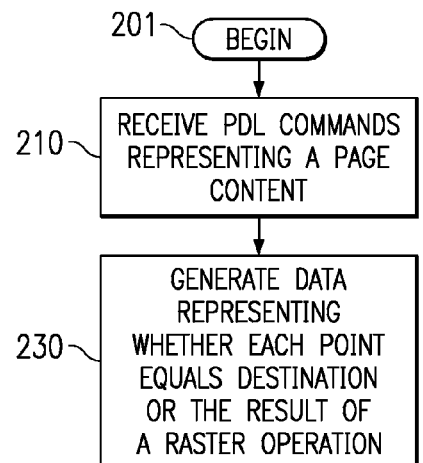
FIG. 2 is a flow chart illustrating the manner in which a printer may efficiently support transparency according to an aspect of the present invention.

FIG. 2 is a flow-chart illustrating the manner in which the number of raster operations can potentially be minimized when transparency needs to be supported in an example embodiment. The flow-chart is described with reference to printer controller 130 of FIG. 1 for illustration. However, the flow-chart can be used in other printers as well. The method begins in step 201 in which control immediately passes to step 210.

In step 210, printer controller 130 receives PDL commands representing page content. The commands may be provided according to PCL language, in which transparency is defined according to the following equations:

$$\text{if source is transparent \&\& source==white, return destination} \quad \text{Eq. (1)}$$

$$\text{if pattern is transparent \&\& pattern==white, return destination} \quad \text{Eq. (2)}$$

$$\text{else return ROP3(source, pattern, destination)} \quad \text{Eq. (3)}$$

wherein white implies no color, "==" represents a logical equality operation, "&&" a logical AND operation, and ROP3 represents a raster operation specified by the PCL. For further information on PCL, the reader is referred to a document entitled, "APCL 5C Color Reference Manual", available from Hewlett-Packard Company (www.hp.com), which is incorporated in its entirety herewith.

In step 230, printer controller 130 generates data representing whether each point in the destination should equal (prior) destination or the result of a raster operation. In an embodiment described below, the generated data contains a bit for each point, with one logical value indicating that the point should equal the prior destination and the second logical value indicating that the point should equal the raster operation. The bits together are referred to as mask data. Other forms of data representation may be used to represent the same information as will be apparent to one skilled in the relevant arts by reading the disclosure provided herein.

As may be appreciated from equations (1)-(3), a bit equals prior destination (value at the same position) when the condition of either Equation (1) (i.e., (source is transparent && source==white)) or Equation (2) (i.e., (pattern is transparent && pattern==white)) noted in the background section is satisfied. Or else, the point equals the result of the raster operation as specified by the PDL.

In step 240, printer controller 130 generates destination bit map data based on either raster operation result or prior destination according to the data of step 230. In one embodiment described below with reference to FIG. 5, the raster operations are performed, but either the prior destination or the result of the raster operation is selected based on the mask data generated step 230.

In an alternative embodiment, printer controller 130 performs raster operations only for the points equaling the raster operation as specified by the data generated (mask data in the embodiment below) in step 230. As the raster operations may not be performed for potentially many points, the processing power required in printer controller 130 to timely generate the entire page content may be reduced. The implementation of such an alternative embodiment will be apparent to one skilled in the relevant arts based on the disclosure provided herein.

Additional embodiment(s) implementing the flow-chart of FIG. 2 are described below in further detail. The description is now continued with reference to the manner in which optimizations in the performance of raster operations while filling an object/portion in a destination with a color value.

4. Color Value Fills

Figure 3:
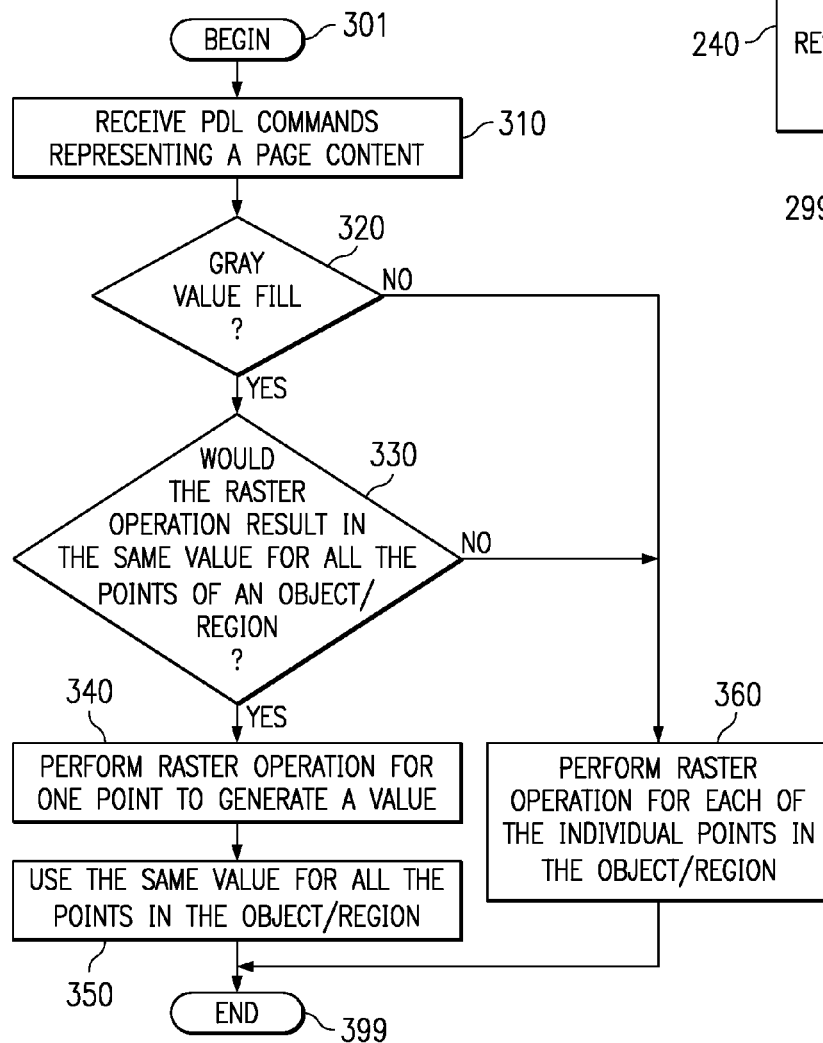
FIG. 3 is a flow chart illustrating the manner in which a printer may efficiently support color fill of an object according to an aspect of the present invention.

FIG. 3 is a flow-chart illustrating the manner in which an object (or image portion) may be filled with a color value according to an aspect of the present invention. The flow-chart is described with reference to printer controller 130 of FIG. 1 for illustration. However, the flow-chart can be used in other printers as well. The method begins in step 301 in which control immediately passes to step 310.

In step 310, printer controller 130 receives PDL commands representing page content. The PDL statements may be received according to industry standards such as PCL. In step 320, printer controller 130 determines whether an operand object is to be filled with a color. If the object is to be filled with color, control passes to step 330, or else control passes to step 360. Such a determination may be made at an interpretation stage. In step 360, printer controller 130 performs raster operation for each of the individual points in the object/region.

In step 330, printer controller 130 determines whether performing the raster operations (necessary to generate bit map for the object) result in the same value for all the points of the object. In general, all possible raster operations may be analyzed to determine the specific raster operations satisfying the criteria of step 330. In such a situation of positive determination in step 330, control passes to step 340 and to step 360 otherwise.

For example, a color value fill may specify a value of 234 and raster operation may merely specify that the value is to be inverted (assuming 255 is maximum color value, a value of 21 may be generated as the inverted value). As may be readily observed, the value 21 (representing the color) would need to be filled for all points of the image portion in the destination.

In step 340, printer controller 130 performs a raster operation for one point to generate a value. In the example of above paragraph, a value of 21 would be generated. In step 350, the value is used for all the points in the object/region. Thus, due to the operation of steps 330, 340 and 350, performance of raster operations may be avoided for several points, thereby minimizing the processing requirements within printer controller 130 while generating a bit map representing page content.

Additional embodiment(s) implementing the flow-chart of FIG. 3 is described in section(s) below in further detail. The description is continued with reference to the manner in which a pattern is tiled on a page in an embodiment of the present invention.

5. Tiling

FIG. 4 is a flow-chart illustrating the manner in which a pattern may be tiled on an entire image portion according to an aspect of the present invention. The flow-chart is described with reference to printer controller 130 of FIG. 1 for illustration. However, the approach can be used in other printers as well. The method begins in step 401 in which control immediately passes to step 410.

In step 410, printer controller 130 receives PDL commands requesting that a pattern object be tiled on an entire image portion. The PDL commands may also include pattern data representing the pattern object. In step 420, printer controller 130 stores the pattern data in a memory.

In step 450, printer controller 130 provides the stored data as an input to raster operations generating all the tiles on the image portion. For example assuming that a pattern contains 30 pixels and the pattern is to be tiled 60 times on a source object of size 1800 pixels, a prior system may create a bit map of size 1800 from the pattern and then perform raster operations on a bit-by-basis. In contrast, an embodiment according to FIG. 4 may provide the same 30 bits of pattern to multiple tiling operations.

As additional memory and processing power are not utilized in generating additional bit maps (as in prior art), a printer controller according to FIG. 4 may minimize the memory and processing requirements in generating a page content. The description is continued with reference to the internal details of printer controller 130 in an embodiment of the present invention.

6. Printer Controller

FIG. 5 is a block diagram illustrating the details of an embodiment of printer controller 130 implemented in accordance with the present invention. Printer controller 130 is shown containing parser 505, interpreter 510, rendering scheduler 520, interface code 530, rendering module 550, global variables block 555, band buffer 560, memory 570 and look up table 580. Each component is described in further detail below.

Parser 505 ensures that the statements (describing a page content) received on path 101 are consistent with a page description language (PDL), and passes the received statements to interpreter 510. Parser 505 may be implemented in a known way.

Interpreter 510 converts the statements received in PDL format to corresponding display lists. In addition, interpreter 510 may perform various tasks to support the approaches of FIGS. 2-4 as described below.

With reference to the approach of FIG. 2 in support of transparency, interpreter 510 may generate a data mask representing whether each point in the destination should equal the prior destination value or a result of a raster operation according to Equations (1) and (2) noted above. Whether transparency is in effect for source (Equation (1)) or pattern (Equation (2)) may be determined based on the PDL statements.

In addition, whether source (pattern) is white may be determined by examining the pixel data related to all planes (e.g., RGB or CMYK). Once the transparency and white determination are made for each point, interpreter 510 generates the mask data accordingly. The generated mask data may be stored in memory 570.

Generating mask data in interpreter 510 offers several advantages. For example, the bit map generation by rendering module 550 may be simplified substantially and the page content may be timely generated. In addition, the potentially time consuming task of examining multiple color planes is delegated to interpreter 510, which can operate "off-line" (i.e., any length of time duration before start of print of a page).

At least in situations where memory management and number of accesses need to be optimized (e.g., in an embodiment associated with FIG. 6), generating mask data in the interpretation stage may be desirable since all the color planes may be available in the memory for other purposes as well. As may be appreciated, determination of whether a point is represented by white color, may require that the corresponding data in all the color planes be examined.

Global variables 555 represent various values used for rendering (and other operations). For example, a global variable may include information on specific paint object, including whether the paint object is a color value or a pattern and the specific paint object to be presently used for rendering. The global variables may also store information representing whether transparency (for source or pattern) is presently in effect. The information may be used to implement the features of FIGS. 2-4 as described below with reference to rendering module 550.

Rendering scheduler 520 schedules each logical part for subsequent processing (rendering). One of several well known approaches may be used to implement rendering scheduler 520. Interface code 530 provides the interface between rendering scheduler 520 and rendering module 550. In general, interface code 530 interfaces with rendering scheduler 520, and performs various initializations required for rendering modules. The initializations include configuration of some of the global variables 555 (transparency status and color/pattern paint information) noted above.

Rendering module 550 generates a bitmap for the page based on the display list provided, and stores the bit map in band buffer 560. In general, rendering needs to be performed to support the specific PDL (e.g., PostScript, Page Description Language) and the interpretation approach used. In addition, rendering module 550 may support the approaches of FIGS. 2-4 as described below.

With reference to the approach of FIG. 2, rendering module 550 may examine the data in global variables 555 to determine whether transparency is presently effective for source or pattern. If transparency is in effect, rendering module 550 retrieves the data of step 230 (e.g., the mask data) from memory 570 to determine whether to simply use the present destination bit or perform a raster operation for each bit.

That is, if a bit corresponding to a point indicates that the result of raster operation is to be used, the result is provided as representing the point. Or else, the prior destination is provided as representing the point. In such an embodiment, the raster operations are performed even if the results are not used. In an alternative embodiment, raster operations are performed only if the data indicates that the result of the raster operation provide the data for a corresponding point.

With reference to the approach of FIG. 3, rendering module 550 examines global variables 555 to determine whether a present paint operand equals a color value. Rendering module 550 may also examine whether the raster operation is of the type which permits the same value for all points in the region specified by a display list presently being processed. The two determinations can be performed in any sequence. If an affirmative determination is made in both cases, rendering module 550 may compute the value for only one point, and use the value for all the points in the region.

With reference to the approach of FIG. 4, rendering module 550 retrieves the patterns data stored in memory 570 multiple times to support the tiling operations. For example, assuming that a pattern contains 30 pixels and is to be tiled 60 times on an object containing 1800 pixels, rendering module may use the same 30 pixels of data 60 times, as opposed to generating a new image of 1800 pixels containing the pattern tiled 60 times, and then performing a raster operation on a bit by bit basis.

Instead, rendering module 550 may store the 30 pixels in a memory and use the same data for tiling the pattern on the entire object (e.g., source). In a software implementation described below, the pixels may be provided as a circular buffer such that the $31^{st}$, $61^{st}$, $91^{st}$, etc., pixels maps to the $1^{st}$ pixel. As a result, the memory and processing requirements may be minimized in printer controller 130.

Thus, using the approaches described above, several embodiments of printer controller 130 may be implemented to efficiently process images. The embodiments may be implemented in a combination of software, hardware and firmware. The description is continued with reference to the manner in which printer controller 130 may be implemented substantially in software.

7. Software Implementation

FIG. 6 is a block diagram illustrating the details of printer controller 130 implemented substantially in software according to an aspect of the present invention. Printer controller 130 is shown containing input/output (I/O) interface 610, central processing unit (CPU) 630, on-chip memory 640, random access memory (RAM) 650 and engine interface 670. Each component is described below in further detail.

Input/output interface 610 provides the interface with an external system such as personal computer. I/O interface 610 receives statements on path 101 requesting to print a page content specified in a page description language (PDL). The statements may be forwarded for storage in RAM 650, for example, via CPU 630 on line 613.

Engine interface 670 provides an interface between printer controller 130 and printer engine 170. Lines 498 and 499 together represent line 137 illustrated in FIG. 1. Engine interface 670 may be implemented in a known way.

On-chip memory 640 generally allows faster accesses in storing and retrieving data, and may be used to store the data requiring fast accesses. In an embodiment, on-chip memory 640 is used to store the rendered bit maps. By storing rendered bit maps in on-chip memory 640, the storing task may not be a bottleneck while CPU 630 renders a bit map. Such a feature may be particularly important as the processing speeds of CPU 630 may improve substantially over time. The bit maps are then transferred to RAM 650 (which is used to provide band buffer 460).

RAM 650 may be used to store the instructions prior to execution (by CPU 630). In addition, RAM 650 may be used to implement temporary buffer 570 and band buffer 560. Secondary memory 640 may contain units such as hard drive (not shown), removable storage (e.g., flash memory, also not shown). Secondary storage 640 may store software instructions and data (for example, the global parameters), which enable CPU 630 to provide several features in accordance with the present invention. The software instructions may be provided to CPU 630 from other sources such as over a network implemented using protocols such as TCP/IP.

CPU 630 executes the instructions provided from secondary memory to process the print statements and generate bit maps as described in the previous sections. The instructions may also cause the bitmap to be provided to printer engine 170 on path 498.

Thus, the present invention may be implemented using software running (that is, executing) in printer controller 130. In this document, the term Acomputer program product≤ is used to generally refer to removable storage unit or hard disk installed in hard drive. These computer program products are means for providing software to printer 100. These computer program products generally contain a computer readable medium providing software to printer controller 130. The computer readable medium can be provided external to printer controller 130.

The approaches of above may lead to several advantages. For example, systems with memory constraints may save data (e.g., rendered bit maps or display lists) in compressed format. By minimizing the memory requirements, systems may not need to expend the processing power to compress and decompress the data. In addition, as "lossy" compression techniques may not need to be used, the quality of the generated images may be high.

8. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of filling an image portion of a page to be printed with a corresponding color, said method being performed in a printer, said method comprising:

receiving a plurality of commands specifying content for said image portion of said page, said image portion containing a plurality of points, said plurality of commands including at least one command specifying a raster operation to be performed to generate a bit map representing said image portion, said raster operation being performed on at least one operand, and indicating that said one operand is to be filled with corresponding color;

determining for each raster operation whether performing said raster operation of said at least one command would result in a same value of said corresponding color being generated for all of said plurality of points of said image portion of said page;

if said same value would be generated for all of said plurality of points of said image portion of said page, performing said raster operation for only one of said plurality points to determine said same value and using said same value for all of said plurality of points of said image portion of said page; and if said same value would not be generated for all of said plurality of points of said image portion of said page, performing said raster operation for each of said plurality points to determine a value for each corresponding point and using said value for said corresponding point of said image portion of said page.

2. The method of claim 1, wherein said raster operation comprises an inversion.

3. The method of claim 2, wherein said one operand comprises a source or a paint.

4. The method of claim 3, wherein said determining is performed in a raster operation module.

5. A printer controller filling an image portion of a page to be printed with a corresponding color, said printer controller comprising:

means for receiving a plurality of commands specifying content for said image portion of said page, said image portion containing a plurality of points, said plurality of commands including at least one command specifying a raster operation to be performed to generate a bit map representing said image portion, said raster operation being performed on at least one operand, and indicating that said one operand is to be filled with said corresponding color;

means for determining for each raster operation whether performing said raster operation of said at least one command would result in a same value of said corresponding color being generated for all of said plurality of points of said image portion of said page;

means for performing said raster operation for only one of said plurality points to determine said same value and using said same value for all of said plurality of points of said image portion of said page, if said same value would be generated for all of said plurality of points of said image portion of said page; and means for performing said raster operation for each of said plurality points to determine a value for each corresponding point and using said value for said corresponding point of said image portion of said page, if said same value would not be generated for all of said plurality of points of said image portion of said page.

6. The printer controller of claim 5, wherein said raster operation comprises an inversion.

7. The printer controller of claim 6, wherein said one operand comprises a source or a paint.

8. The printer controller of claim 7, wherein said means for determining is comprised in a raster operation module.

9. A non-transitory computer readable medium carrying one or more sequences of instructions for causing a printer to fill an image portion of a page to be printed with a corresponding color, wherein execution of said one or more sequences of instructions by one or more processors contained in said printer causes said one or more processors to perform the actions of:

receiving a plurality of commands specifying content for said image portion of said page, said image portion containing a plurality of points, said plurality of commands including at least one command specifying a raster operation to be performed to generate a bit map representing said image portion, said raster operation being performed on at least one operand, and indicating that said one operand is to be filled with said corresponding color;

determining for each raster operation whether performing said raster operation of said at least one command would result in a same value of said corresponding color being generated for all of said plurality of points of said image portion of said page;

if said same value would be generated for all of said plurality of points of said image portion of said page, performing said raster operation for only one of said plurality points to determine said same value and using said same value for all of said plurality of points of said image portion of said page; and if said same value would not be generated for all of said plurality of points of said image portion of said page, performing said raster operation for each of said plurality points to determine a value for each corresponding point and using said value for said corresponding point of said image portion of said page.

10. The non-transitory computer readable medium of claim 9, wherein said raster operation comprises an inversion.

11. The non-transitory computer readable medium of claim 10, wherein said one operand comprises a source or a paint.

12. The non-transitory computer readable medium of claim 11, wherein said determining is performed in a raster operation module.

* * * * *